Aug. 16, 1955
E. A. JOHNSON, JR
2,715,323
PRODUCTION OF OXYGEN BY LIQUEFACTION
AND RECTIFICATION OF AIR
Filed Sept. 11, 1948
2 Sheets-Sheet 2
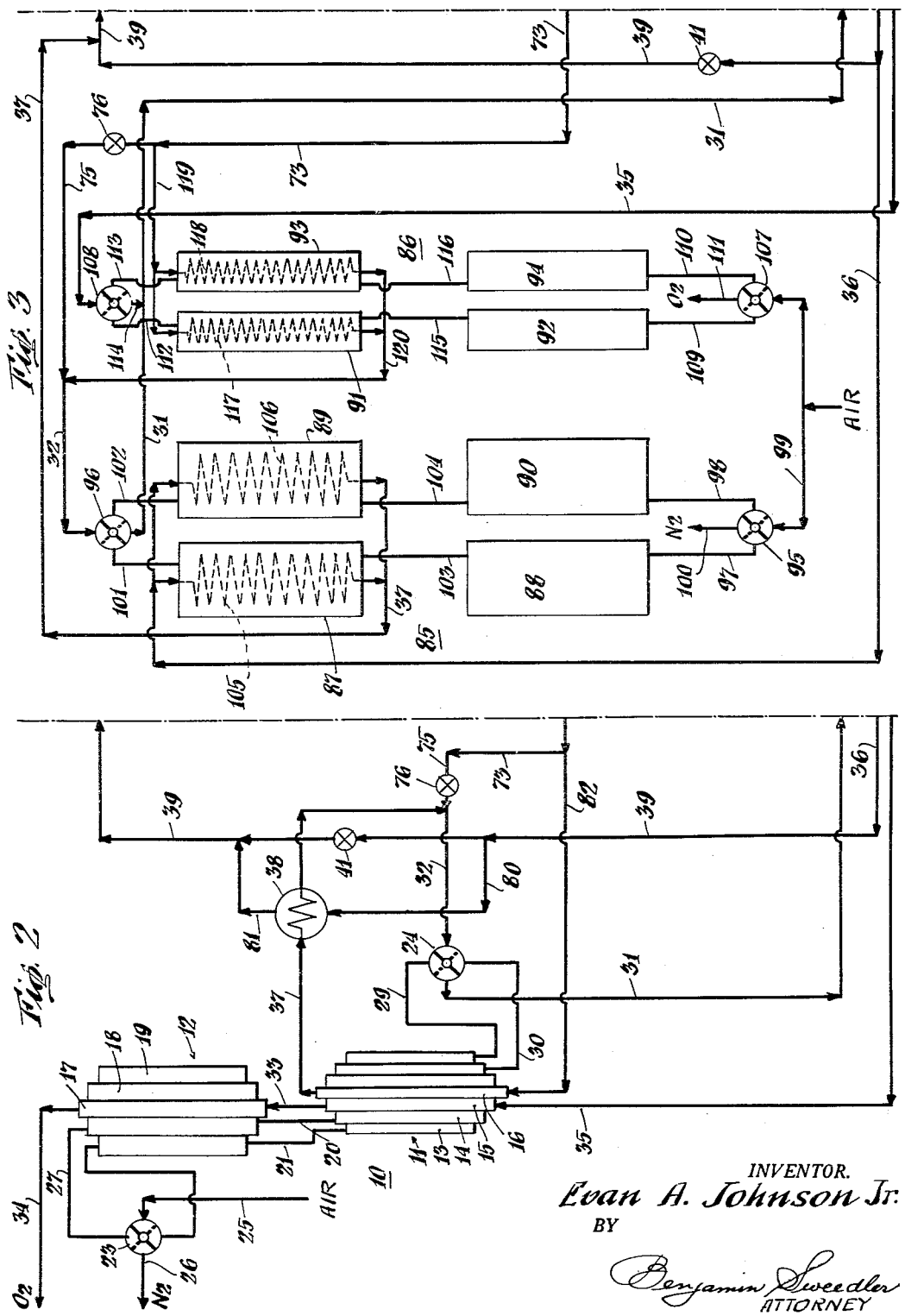
INVENTOR.
Evan A. Johnson Jr.
BY
Benjamin Sweedler
ATTORNEY

United States Patent Office 2,715,323
Patented Aug. 16, 1955

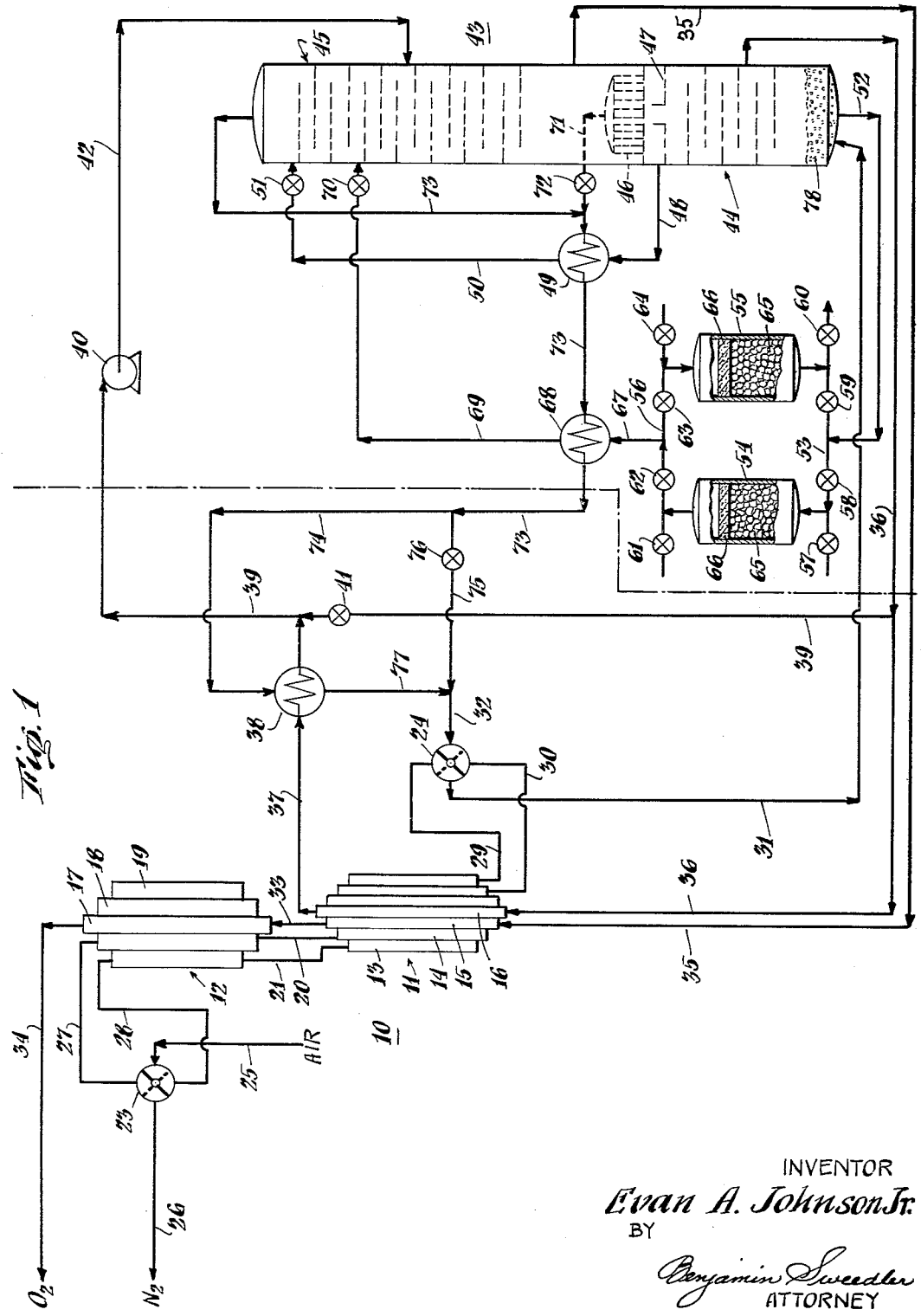

2,715,323

PRODUCTION OF OXYGEN BY LIQUEFACTION AND RECTIFICATION OF AIR

Evan A. Johnson, Jr., New York, N. Y., assignor to Hydrocarbon Research, Inc., New York, N. Y., a corporation of New Jersey Application September 11, 1948, Serial No. 48,908

14 Claims. (Cl. 62—123)

This invention relates to processes for producing oxygen by the liquefaction and rectification of air and without the use of chemical reagents to effect the removal of carbon dioxide present in air.

All temperatures herein are in degrees F. and pressures in pounds per square inch gauge.

This invention is in the nature of an improvement on oxygen processes involving the flow of air under pressure through a path in a reversing exchanger in which the air recovers the cold content of the outgoing products of rectification, the air being thus cooled to a temperature close to its condensation point at the pressure existing in the reversing exchanger, thereby through solidification substantially completely removing all carbon dioxide present in the air, expanding a minor portion of the air to supply the refrigeration necessary to compensate for heat leaks into the system and cold losses resulting from the difference in enthalpy between the incoming air and the outgoing products of rectification (herein referred to as enthalpy losses), introducing the expanded air into the low pressure stage of the rectification system and introducing the remaining major portion of the air into the high pressure stage of the rectification system. Periodically the flow of a rectification product and the air through the reversing exchanger is reversed through their respective flow paths. Also a rectification product or portion of the cooled air stream is recirculated through the cold end of the reversing exchange in indirect heat exchange relation with the main air or rectification product streams passing therethrough to bring the temperature of the exiting air stream within 5° to 10° F., preferably 6° to 8° F., of the temperature of the incoming rectification product stream. By operating in this manner, substantially complete purging of carbon dioxide is obtained upon each reversal of flow permitting substantially continuous operation.

In the practice of such processes it has been found solid particles of carbon dioxide are entrained in the air stream and it is necessary to pass the air stream flowing to the expander through one of a pair of filters to remove the entrained carbon dioxide from the air stream flowing into the expander. The air flows through one of the pair of filters while the other is being purged of carbon dioxide. When filtration through the first-mentioned filter is materially reduced, the flow of air is switched so that it is passed through the clean filter, the first-mentioned filter being then purged to place it in good filtering condition again to effect removal of carbon dioxide. The air filters and their maintenance add substantially to the cost of installation and operation of the equipment required for the production of oxygen. Further, the periodic reversal results in a substantial heat leak into the system caused by warming up the filter to effect purging of the carbon dioxide.

It is an object of this invention to provide a process of the type hereinabove set forth for producing oxygen, which process eliminates the necessity of using air filters for filtering the cooled air flowing from the reversing exchanger into the expander.

Other objects and advantages of this invention will be apparent from the following detailed description thereof.

In accordance with this invention air compressed, for example, to a pressure of from about 60 to about 100 pounds, preferably from about 75 to about 90 pounds, and at a temperature of from about 70° to about 110° F. is passed through a reversing exchanger in indirect heat exchange relation with a stream of rectification product, the air being thus cooled to a temperature close to its condensation point. The reversing exchanger may be of either the regenerative or of the recuperative type. The cooled air with suspended particles of carbon dioxide is then passed to the high pressure stage of the rectification system and brought into intimate contact with the crude liquid oxygen maintained in a lower portion of this high pressure stage of the rectification system. A minor portion of the liquid-scrubbed air now freed of suspended particles, say from 15% to 35%, preferably about 20% to 25%, containing at least 17% by volume of oxygen, preferably at least 20%, is withdrawn from the high pressure stage, and is warmed by flow through the colder end portion of the reversing exchanger or in indirect heat exchange relation with a stream passing through said portion of the reversing exchanger. In this way the temperature approach between the air stream leaving and the rectification product stream entering the reversing exchanger is maintained between 5° to 10° F., preferably 6° to 8° F., and efficient purging of condensed impurities like carbon dioxide is effected upon each reversal. The thus warmed portion of air is expanded to produce the refrigeration necessary to compensate for heat leaks into the system and for enthalpy losses. The expanded air is passed to the low pressure stage into the rectification system.

The remaining major portion of the air is rectified in the high pressure stage and the crude liquid oxygen thus produced contains suspended particles of carbon dioxide and acetylene in solution, these impurities having been removed from the cold air stream by the scrubbing contact with the crude liquid oxygen. The crude liquid oxygen is then passed through liquid filters to effect removal of carbon dioxide particles before introduction as reflux into the low pressure stage. The carbon dioxide filters may also be provided with absorbers to effect removal of acetylene.

Periodically the flow of the incoming air and the outgoing rectification product is reversed through their respective flow paths, the rectification product effecting removal by sublimation and evaporation of the carbon dioxide deposited in the reversing exchanger during the preceding step in the process. The flow, however, of the scrubbed air from the rectification system to the expander remains unchanged. The reversal of flow may take place at from 3 to 5 minute intervals.

In the accompanying drawings forming a part of this specification and showing, for purposes of exemplification preferred layouts of equipment for practicing the process of this invention, Figure 1 illustrates diagrammatically a preferred layout of apparatus for practicing the process of this invention;

Figure 2 illustrates a modified arrangement of heat exchangers which may be substituted for the heat exchange system shown to the left of the dot and dash line on Figure 1; and Figure 3 illustrates a modified arrangement of apparatus involving heat exchangers of the regenerative type which may be substituted for the exchanger system shown to the left of the dot and dash line on Figure 1.

It will be understood the drawings illustrate diagrammatically preferred apparatus for practicing this invention and that the invention may be carried out in other apparatus, for example, any desired number of reversing exchangers may be used instead of the reversing exchangers shown in the drawings, each pair of reversing exchangers arranged in series may be replaced by one long exchanger and other rectification systems may be used in lieu of that shown in Figure 1, including, for example, rectification systems in which separate columns are used for the low and high pressure stages.

In the drawings, like reference characters indicate like parts.

Referring to Figure 1, 10 is a recuperative heat exchanger which may be of any well known type. In the embodiment shown in the drawings, it consists of two sections 11 and 12, each consisting of a single shell. Section 11 is provided with four flow paths 13, 14, 15 and 16 disposed in concentric relationship in heat exchange relation with each other. Section 12 is provided with interior flow path 17 and concentric paths 18 and 19 disposed in heat exchange relation with each other. The heat exchanger 10 has in each of the paths suitable fins of heat conducting material, e. g., copper or aluminum, permitting rapid and efficient heat exchange between the gaseous media flowing therethrough.

For purposes of illustration and in the interests of simplicity, each flow path is shown on the drawings as consisting of a single tube, the several paths being disposed concentrically. Actually, however, each path in each exchanger may comprise a multiplicity of tubes for flow therethrough. As the construction of the heat exchanger per se does not form a part of this invention and as it may be of any well known type, it is believed further description thereof is unnecessary.

Path 18 is connected with path 14 by line 20 and path 19 with path 13 by line 21. These paths 18, 14 and 19, 13 are the paths through which air and nitrogen flow, the flow of these two media through their respective paths being periodically reversed so that during one step of the process air flows through paths 19 and 13 and nitrogen through paths 18 and 14 and upon reversal during the succeeding step air flows through paths 18 and 14 and nitrogen through paths 19 and 13. Reversal of flow is accomplished by suitably positioning the reversing valves 23, 24 which may be of any well known type. Valve 23 is disposed in the pipe line system consisting of air inlet pipe 25 leading into valve 23, nitrogen exit line 26 leading to any suitable point of nitrogen disposal and pipe lines 27, 28 leading to one end of paths 18 and 19. Lines 29 and 30 lead from the flow paths 13 and 14 of section 11 to valve 24. A line 31 leads from valve 24 to the high pressure stage of the rectification system hereinafter described and nitrogen line 32 leads into valve 24.

Flow paths 15 and 17 are the flow paths through which oxygen flows. These paths are interconnected by line 33. Flow path 17 is provided with an exit line 34 leading to a suitable point of oxygen storage or utilization and the flow path 15 is provided with an inlet line 35 leading from the low pressure stage of the rectification system. Flow of oxygen through flow paths 15 and 17 continues unidirectionally, i. e., flow through these flow paths is not reversed.

Flow path 16 is the flow path through which a portion of the air is recirculated to warm the air, the thus warmed air passing in heat exchange relation with a minor portion of the cold nitrogen, which minor portion is then mixed with the remaining major portion to produce the mixed nitrogen stream of somewhat higher temperature, which enters valve 24 through line 32. In this way the temperature approach between the temperature of the air leaving flow path 13 or 14, as the case may be, and the temperature of the nitrogen entering one or the other of these flow paths is brought within the range of 5° to 10° F., preferably 6° to 8° F., resulting in more efficient purging of these flow paths. Flow path 16 is provided with an inlet line 36 leading from the high pressure stage of the rectification system and an exit line 37 passing through a non-reversing exchanger 38 to a branch line 39 which connects line 36 with an expander 40, which may be a centrifugal expander or turbine of any well known type. A valve 41 in branch line 39 controls the amount of air by-passing the flow path 16; the air thus by-passed mixes with the air warmed by passage through flow path 16 and then cooled somewhat by flow through exchanger 38, the resultant air mixture flowing to expander 40 at a temperature such that no liquefaction of air in the expander takes place. A line 42 connects the expander 40 with the low pressure stage of the rectification system 43.

Rectification system 43 comprises a two-stage rectification column, the lower section 44 of which is operated at a pressure of about 60 to 100 pounds, preferably about 75 to 90 pounds, and the upper section 45 of which is operated at a pressure of about 4 to 12 pounds, preferably at about 5 to 8 pounds. This column, as is customary, is provided with rectification plates of the bubble cap or other desired type. The lower section 44 communicates with a condenser 46 which acts as a reboiler for the low pressure stage 45 and condenser 46 has a liquid collecting shelf 47 disposed immediately below the condenser for collecting liquid nitrogen. Pipe line 48 leads from this shelf 47 to a non-reversing heat exchanger 49. A line 50 provided with a pressure reducing valve 51 leads from the non-reversing exchanger 49 to the top of low pressure stage 45.

From the base portion of the high pressure stage 44 a line 52 leads to a line 53 communicating with a pair of liquid purifiers 54, 55. A line 56 is communicably connected with the opposite ends of the purifiers 54, 55. Line 53 is provided with a pair of valves 57 and 58 associated with purifier 54 and with a second pair of valves 59, 60 associated with purifier 55. Line 56 is provided with a pair of valves 61, 62 associated with purifier 54 and a second pair of valves 63, 64 associated with purifier 55. Only one of the purifiers 54, 55 is placed on stream during operation. For example, valves 57, 59, 61, and 63 may be closed and valves 58 and 62 opened so that flow of crude liquid oxygen from line 52 takes place through purifier 54 and line 56. Simultaneously, purifier 55 may be purged by passing a suitable purge medium, e. g., nitrogen or air, through the open valve 64 into and through the purifier 55 and through open valve 60. When purifier 54 requires purging, valves 58, 60, 62, and 64 are closed and 59, 63 opened, thereby placing purifier 55 on stream. Purifier 54 may then be purged by opening valves 61 and 57 and passing a suitable purge medium therethrough, as hereinabove described in connection with the purging of purifier 55.

Preferably each of the purifiers 54 and 55 consists of a bed 65 of granular silica gel absorbent having superimposed thereon a filter plate 66 for effecting removal of carbon dioxide particles from the liquid crude oxygen. This filter may be porous silicon carbide or porous metal. The silica gel acts to absorb the acetylene dissolved in the crude liquid oxygen and the filter medium 66 to separate out the solid carbon dioxide. The silica gel absorbent and the filter disposed in each of the purifiers 54 and 55 are preferably so proportioned that the filter and absorber both require purging at about the same time. Instead of having the silica gel in one and the same unit as the filter 66, as shown in Figure 1, separate units, one functioning to effect removal of acetylene and the other carbon dioxide from the liquid oxygen may be employed and these units may be designed to permit purging of each independently of the others.

A line 67 leads from line 56 to a non-reversing exchanger 68. From exchanger 68 a line 69 having an expansion valve 70 therein leads to the low pressure stage 45 for introduction thereinto, as reflux, of crude oxygen freed of acetylene and carbon dioxide. If desired, purifiers 54 and 55 may be positioned in line 69 following exchanger 68 instead of preceding this exchanger as shown in Figure 1.

From the top of condenser 46 a line 71 provided with a valve 72 leads into nitrogen line 73 leading from the top of low pressure stage 45. Nitrogen line 73 passes through non-reversing exchangers 49 and 68 and is provided with a branch 74 leading into exchanger 38 and a second branch 75, flow through which is controlled by a valve 76. The major portion of the nitrogen flows through line 75 into line 32 where it mixes with the minor portion of the nitrogen flowing through line 74, exchanger 38, line 77 into line 32.

In the operation of the equipment of Figure 1, air is admitted through line 25 and, as indicated by the full line valve settings, flows through line 28, flow path 19, line 21, flow path 13 in indirect heat exchange relation with nitrogen flowing through flow paths 14 and 18 and oxygen flowing through flow paths 15 and 17. The air leaving flow path 13 through line 29 is thus cooled to a temperature close to its condensation point, at which temperature it enters valve 24, and flows from this valve through line 31, passing through the liquid body 78 of crude oxygen maintained at the base of the high pressure stage 44. The air bubbles through this crude liquid oxygen which effects removal of entrained carbon dioxide and acetylene from the air. A minor portion of the liquid-scrubbed air stream containing at least 17% by volume of oxygen, and preferably at least 20%, is withdrawn through line 36 and is divided into two streams, one of which passes through by-pass line 39 and the other through flow path 16. The air flowing through path 16 is warmed by the air flowing in a countercurrent direction through flow path 13. The thus warmed minor air stream flows through line 37, exchanger 38 where it gives up a portion of its heat to the nitrogen stream passing through this exchanger. The air stream then mixes in line 39 with the remainder of the minor portion of the air stream passing through this line and the resulting mixture at a temperature such that liquefaction of the air in expander 40 does not take place is introduced into this expander and expanded. The expanded air flows through line 42 into the low pressure stage 45 of the rectification system.

Crude oxygen from the body 78 thereof maintained at the base of high pressure stage 44 of the rectification system is continuously withdrawn through line 52, passed through one or the other of the purifiers 54, 55 which effect removal of the carbon dioxide and acetylene contained therein and then flows through lines 56, 67 to the exchanger 68 where it is cooled by the nitrogen passing in indirect heat exchange relation therewith through this exchanger. The crude oxygen then passes through line 69 and is flashed as it passes through expansion valve 70 into the low pressure stage 45.

Liquid nitrogen flows from shelf 47 through line 48 into exchanger 49 where it is cooled by the nitrogen flowing through this exchanger. From this exchanger the cooled nitrogen flows through line 50, expansion valve 51 where it is flashed and thus further cooled, entering the low pressure stage 45 where it serves as reflux liquid.

Gaseous nitrogen flows through line 73, exchangers 49 and 68, a minor portion of this nitrogen flow through branch line 74 into exchanger 38 where it is warmed by the air stream passing through this exchanger and thence through line 77 into line 32 where it mixes with the remainder of the nitrogen flowing into line 32 from branch 75. From line 32 the nitrogen passes through reversing valve 24, line 30, flow paths 14 and 18, exiting through line 27, valve 23 and line 26.

Product oxygen flows continuously from the low pressure stage 45 through line 35, flow paths 15 and 17, exiting through line 34.

Upon reversal, which may take place every three minutes, as indicated by the dotted line valve settings, air flows from line 25 through valve 23 into and through line 27, flow paths 18 and 14, while the nitrogen flows through flow paths 13 and 19 and the oxygen flows through flow paths 15 and 17. No reversal of flow of the oxygen or of the minor portion of the air passing through flow path 16 takes place. The flow of the various streams from the reversing valve 24 to the rectification system 43, as well as the flow of the various streams hereinabove described, within the rectification system and from the rectification system to the heat exchanger 10 remains the same. Upon each reversal, the nitrogen effects removal by sublimation and evaporation of carbon dioxide and other condensible impurities of air, e. g., moisture, deposited in exchanger 10 during the preceding step of the process.

Figure 2 differs from Figure 1 chiefly in that a portion of the air stream from line 36 is not passed through a flow path in exchanger section 11 but a portion of the nitrogen is recirculated through the flow path 16 of exchanger section 11, this portion of the nitrogen is then passed in heat exchange relation with a portion of the air stream flowing to the expander to warm this portion of the air stream so that upon admixture with the remainder of the air passing to the expander a mixed air stream is produced at a temperature such that liquefaction of the air within the expander does not take place upon its expansion. The minor portion of the nitrogen warmed as a result of its flow through path 16 is mixed with the remainder of the nitrogen passing to the exchanger 10 and the resultant mixed nitrogen stream passed through this exchanger.

In the modification of Figure 2, the air line 36 leads from the high pressure stage 44 of the rectification system to line 39 provided with a branch line 80 leading into the non-reversing exchanger 38 from which a line 81 leads back into air line 39. Valve 41 regulates the proportion of air flowing through line 80 into exchanger 38 and that flowing through line 39. The air circulated through line 80, exchanger 38 and line 81 admixed with the air flowing through line 39 produces an air mixture at a temperature such that upon expansion in expander 40 no liquid air is formed in the expander.

Nitrogen line 73 is provided with a branch 82 leading into the flow path 16 in exchanger section 11. Line 37 leads from the exit end of flow path 16, to exchanger 38, line 37 passes through non-reversing exchanger 38 and communicates with main nitrogen line 32. The warmed nitrogen stream from flow path 16 in its flow through exchanger 38 gives up a portion of its heat to the air stream passing through this exchanger 38 and then mixes with the remainder of the nitrogen flowing into line 32. A valve 76 regulates the proportion of the nitrogen passed from line 73 through flow path 16 relative to that flowing through line 75 into line 32. In this way a mixed nitrogen stream is produced which enters flow path 13 or 14, as the case may be, at a temperature within 5° to 10° F., preferably 6° to 8° F., of the temperature of the air leaving these flow paths, resulting in effective purging of these flow paths by the nitrogen passing therethrough.

The modification of Figure 3 involves the use of regenerator exchangers and not recuperator exchangers as in Figures 1 and 2. The regenerator system of Figure 3 comprises two regenerator groups 85, 86. Regenerator group 85 comprises two regenerator pairs 87, 88 and 89, 90 for the alternate flow of air and nitrogen therethrough. Regenerator group 86 comprises two regenerator pairs 91, 92 and 93, 94 for the alternate flow of air and oxygen therethrough. Desirably, the capacity of each of the regenerator units of group 85 is four times the capacity of each of the regenerator units of the group 86. Each regenerator unit may be of any well known type. Desirably, regenerators containing packing units of copper or aluminum as disclosed in pending application, Serial No. 783,498, filed November 1, 1947, now Patent No. 2,585,912, may be used.

Reversal of flow through the regenerator group 85 is accomplished by a pair of reversing valves 95, 96. Reversing valve 95 communicates with regenerators 88 and 90 through pipe lines 97 and 98, is provided with an air inlet line 99 and a nitrogen exit line 100. Reversing valve 96 communicates with regenerators 87 and 89 through lines 101 and 102, respectively, is provided with an air exit line 31 and a nitrogen inlet line 32. Lines 31 and 32 correspond to those bearing the same reference numerals in the modification of Figure 1. Regenerator 87 communicates with regenerator 88 through line 103 and regenerator 89 with regenerator 90 through line 104. The regenerators 87 and 89 are provided with paths 105, 106 in indirect heat exchange relation with the air or nitrogen alternately passed through each of these regenerators. A minor portion of the air withdrawn from the high pressure stage of the rectification system and flowing through line 36 is passed through the flow paths 105, 106 into line 37. The thus warmed air flows through line 37 mixing with the air passing through the branch line 39, the resulting mixture entering expander 40 at a temperature such that no liquefaction of the air takes place in this expander upon expansion of the air.

Reversal of flow through regenerator group 86 is accomplished by a pair of reversing valves 107 and 108. Valve 107 is provided with lines 109, 110 leading to regenerators 92 and 94, respectively, with an air inlet line 99 and with an oxygen exit line 111. Reversing valve 108 communicates with the regenerators 91, 93 through lines 112, 113, respectively, is provided with an oxygen inlet line 35 and an air exit line 114 leading into the air line 31. Regenerator 91 communicates with regenerator 92 through line 115 and regenerator 93 communicates with regenerator 94 through line 116.

The regenerators 91 and 93 are provided with flow paths 117 and 118 in indirect heat exchange relation with the air or oxygen alternately passed through each of these regenerators. A branch line 119 leads from the main nitrogen line 73 into the flow paths 117 and 118. These flow paths lead into an exit line 120 which communicates with the main nitrogen line 32. A valve 76 regulates the proportion of nitrogen flowing from line 73 through branch 119 and that continuing its flow through line 75 to line 32 where it is joined by the nitrogen flowing into this line from line 120. Thus a minor portion of the nitrogen is withdrawn through line 119, flows through flow paths 117 and 118 in indirect heat exchange relation with the oxygen and air passing through regenerators 91 and 93 and thence through line 120 into line 32 where it mixes with the major portion of the nitrogen producing a mixed nitrogen stream at a somewhat higher temperature than would otherwise be the case, which mixed nitrogen stream alternately enters regenerators 87 and 89 through lines 101 and 102, respectively.

In the operation of the modification of Figure 3, streams of nitrogen rectification product and air flow over the packing disposed in the regenerator pairs 87, 88 and 89, 90, the nitrogen imparting its cold content to this packing and the air recovering this cold in its flow thereover during the succeeding step of the process. Simultaneously, a minor portion of the total air introduced into the system free of acetylene and carbon dioxide, including entrained solid carbon dioxide, flows through line 36, a part passing through the flow paths 105 and 106, being thus warmed, the thus warmed air mixing with the remainder of the air flowing from line 36 through branch 39 and valve 41. The resulting air mixture from line 39 enters expander 40 at a temperature such that no liquefaction takes place upon expansion of the air within the expander.

Oxygen and air flow alternately through the regenerator pairs 91, 92 and 93, 94, the oxygen imparting its cold content to the packing in these regenerators and the air recovering this cold when it flows thereover during the succeeding step of the process. Simultaneously, a minor portion of the nitrogen flows through the flow paths 117, 118 where it is warmed, the thus warmed nitrogen passing through line 120 into the main nitrogen line 32 where it mixes with the remainder of the nitrogen. The flow of the air through the flow paths 105, 106 and the flow of a minor portion of the nitrogen through paths 117 and 118, followed by the mixing of the thus warmed nitrogen with the remainder of the nitrogen and the flow of the resultant mixed nitrogen stream through regenerators 87 and 89, results in the air leaving the regenerators 87, 89, 91 and 93 at a temperature approximately within 5° to 10° F., usually 6° to 8° F., of that of the nitrogen and oxygen entering these regenerators. Hence, efficient purging of the regenerators by the oxygen and nitrogen passing therethrough results during flow of the nitrogen through one or the other of the regenerator pairs 87, 88 and 89, 90 and the flow of the oxygen through one of the other regenerator pairs 91, 92 and 93, 94, by sublimation or evaporation of condensibles deposited therein during the preceding step of the process. Thus in the continued operation, upon each reversal the nitrogen and oxygen rectification products effect removal of the carbon dioxide, moisture and other condensibles deposited in the regenerators by the air passed therethrough during the preceding step of the process, thereby permitting continuous operation.

One example of the operation of the process of this invention in the apparatus shown in Figure 1 is described below. It will be understod this example is given for purposes of examplification only and the invention is not limited thereto.

This example refers to an oxygen plant operated in a locality where the atmospheric pressure is 14.7 pounds per square inch absolute. All pressures given in the example are in pounds per square inch gauge.

Air under pressure of about 85 pounds at a temperature of 60° F. is supplied to line 25 and flows through valve 23, line 28, flow path 19, line 21, flow path 13, line 29, entering this line at a temperature of —272° F. The air flows through reversing valve 24, line 31 into the high pressure stage 44 of the rectification system 43, the air entering this high pressure stage at a pressure of 83 pounds and at a temperature of —272° F. The air bubbles through a body of crude liquid oxygen (containing approximately 40% oxygen) maintained in the base of the high pressure stage, this treatment effecting removal of carbon dioxide and acetylene from the air. Approximately 25% of the thus washed air containing 20% by volume of oxygen is withdrawn through line 36. Of this fraction, approximately 70% flows from line 36 through flow path 16, the air being thus warmed to a temperature of —215° F. This air then flows through line 37 into exchanger 38 where it is cooled to a temperature of —225° F. The remaining 30% of the washed air flowing through line 36 at a temperature of —275° F. passes through line 39, mixing with the air entering this line from exchanger 38, producing in line 39 a mixed air stream at a temperature of —240° F. and a pressure of 80 pounds. In expander 40 this mixed air is expanded to a pressure of 7 pounds, its temperature thus being reduced to —302° F., at which temperature and pressure it is introduced into the low pressure stage 45.

The remainder of the air (approximately 75% of the total air introduced into the process) is rectified in the high pressure stage 44 and crude liquid oxygen containing approximately 40% oxygen is withdrawn through line 52 and passed through one or the other of the purifiers 54, 55 which effect removal of the carbon dioxide particles by filtration and dissolved acetylene by adsorption from the crude liquid oxygen. From the purifiers 54, 55 the crude oxygen flows through exchanger 68 into and through line 69, through expansion valve 70 where it is flashed, entering the low pressure stage 45 as a vapor-liquid mixture at a temperature of about —309° F. and a pressure of 7 pounds.

Nitrogen at a temperature of —284° F. flows through line 48 into heat exchanger 49 where it is cooled to a temperature of —305° F. by indirect heat exchange with the nitrogen flowing through line 73. The cooled nitrogen at a temperature of —305° F. flows through line 50, expansion valve 51 where it is flashed, entering low pressure stage 45 at a temperature of —313° F. and a pressure of 6 pounds.

Nitrogen at a temperature of —313° F. and a pressure of 6 pounds flows through line 73, is warmed in exchanger 49 to a temperature of —295° F. and is further warmed to a temperature —288° F. in its flow through exchanger 68. Of this nitrogen stream, approximately 20% flows through line 74, exchanger 38, where it is warmed to a temperature of —250° F., flowing through line 77 into line 32 where it mixes with the remainder of the nitrogen, producing a mixed nitrogen stream at a temperature of —280° F. This mixed nitrogen stream flows through valve 24, line 30, flow paths 14 and 18, exiting through line 27, valve 23 and exit line 26 at a temperature of 50° F. and a pressure of 1 pound.

Oxygen at a temperature of —290° F. and a pressure of 8 pounds flows through line 35 and enters flow path 15. In its flow through flow paths 15 and 17 it is warmed to a temperature of 50° F., at which temperature and a pressure of 3 pounds, it exits through line 34.

Upon reversal, which may take place every three minutes, the air flows through paths 18 and 14 in exchanger sections 12 and 11, respectively, the nitrogen through paths 13 and 19. The flow of the various streams is otherwise substantially the same as hereinabove described and the temperature and pressure conditions remain the same. The nitrogen in its flow through paths 13 and 19 removes by sublimation and evaporation the carbon dioxide and frost, if any, deposited in these paths by the air during the preceding step of the process. Thus in the continued operation, the nitrogen rectification product effects removal of the carbon dioxide and frost, if any, deposited in the path through which the air had passed in the preceding step of the process.

In the operation of the process of this invention, it is preferred to effect removal of both moisture and carbon dioxide in the reversing exchanger through which the air is passed. It will be understood, however, that, if desired, the moisture may be removed from the air by any conventional means and dry air containing carbon dioxide passed through the exchanger or exchangers as hereinabove disclosed. In the event dry air is supplied to the process, reversing valve 23 may advantageously be moved to a position between exchanger sections 12 and 11 of Figures 1 and 2, so that reversal of the flow of air and nitrogen takes place only in exchanger section 11 wherein the carbon dioxide is deposited by the air stream. Operation of such an arrangement is carried out so that the temperature at the warm end of exchanger section 11 is at least slightly higher than the temperature at which carbon dioxide begins to deposit from the air stream. In general, the warm end of these exchangers should be at a temperature above about —180° F.

It will be noted this invention provides a process of producing oxygen by the liquefaction and rectification of air in which process a minor portion of the total air introduced into the process is passed to the expander without requiring a filter or other purification treatment to effect removal of entrained carbon dioxide dust and this air expanded to produce the refrigeration necessary to compensate for heat leaks and enthalpy losses and in which process the various streams are passed through the reversing exchangers under conditions resulting in effective purging of these exchangers to remove carbon dioxide deposited therein and thus permit continuous operation.

The expressions "reversing the flow of air and nitrogen" and "reversal" are used herein in the sense commonly employed in this art, namely, to mean the switching of the flow of two streams, for example, the air and the nitrogen or oxygen streams, so that upon each "reversal" the air flows through the path through which had previously flowed the nitrogen or oxygen and the nitrogen or oxygen flows through the path through which had previously flowed the air.

Since certain changes may be made in carrying out the above processes without departing from the scope of the invention, it is intended that all matter contained in the above description shall be interpreted as illustrative and not in a limiting sense. For example, separate reversing exchangers of the recuperative type may be used in which the air and oxygen rectification product on the one hand and the air and nitrogen rectification product on the other flow, the flow of air and oxygen being reversed in the exchanger through which these media flow and the flow of air and nitrogen being reversed in the exchanger through which these media flow. Also, instead of flowing nitrogen through the flow path 16 in Figure 2 and the paths 117 and 118 in Figure 3, oxygen or other rectification product may be passed through these paths, the oxygen thus warmed imparting some of its heat to the air passed to the expander to heat this air so that no liquefaction takes place upon expansion, or being mixed with the oxygen passed through regenerator pairs, 91, 92 and 93, 94 of the modification of Figure 3 to produce an oxygen stream entering these regenerators at a temperature within 5° to 10° F., preferably 6° to 8° F. of the exiting air stream. Moreover, instead of dividing the washed air stream flowing through line 36 into two streams, flowing one of the streams so that it by-passes flow path 16 and the other stream through this flow path, all of the washed air stream may be passed through path 16 and ultimately into expander 40, this flow path being so proportioned that the air leaves it at a temperature such that after giving up a portion of its heat to the nitrogen stream flowing through exchanger 38, if this exchanger is employed, no liquid air is formed in the expander.

What is claimed is:

1. A process for producing oxygen by the liquefaction and rectification of air in a rectification system involving low and high pressure stages, which comprises passing a stream of air under pressure through a path in a reversing exchanger to recover the cold content of an outgoing product of rectification and thus cool the air to a temperature close to its condensation point, periodically reversing the flow of air and rectification product through their respective paths in the reversing exchanger so that upon each of said reversals the rectification product substantially completely removes the carbon dioxide deposited in the reversing exchanger during the preceding step of the process, passing the thus cooled air through a body of crude liquid oxygen in the high pressure stage of the rectification system thus scrubbing said thus cooled air with said crude liquid oxygen, withdrawing a minor portion of the crude liquid oxygen-scrubbed air, warming the withdrawn minor portion by indirect heat exchange with a stream passing through said reversing exchanger to a temperature such that no liquefaction of said withdrawn minor portion takes place upon its expansion, expanding the thus warmed portion, introducing the expanded portion into the low pressure stage, purifying the crude liquid oxygen by filtering out carbon dioxide particles and absorbing dissolved acetylene therefrom, and introducing the thus purified crude liquid oxygen into the low pressure stage for further rectification.

2. A process for producing oxygen by the liquefaction and rectification of air in a rectification system involving low and high pressure stages, which comprises passing a stream of air under pressure of 60 to 100 pounds and at a temperature of 70° to 110° F. through a path in a reversing exchanger to recover the cold content of an outgoing product of rectification and thus cool the air to a temperature close to its condensation point, periodically reversing the flow of air and rectification product through their respective paths in the reversing exchanger so that upon each of said reversals the rectification product substantially completely removes the carbon dioxide deposited in the reversing exchanger during the preceding step of the process, passing the thus cooled air through a body of crude liquid oxygen in the high pressure stage of the rectification system thus scrubbing said thus cooled air with said crude liquid oxygen, withdrawing from 15% to 35% of the crude liquid oxygen-scrubbed air, said crude liquid oxygen-scrubbed air containing at least 17% oxygen, warming the withdrawn portion by flowing at least a part of said withdrawn portion in indirect heat exchange with a stream passing through said reversing exchanger to raise the temperature of said withdrawn portion to a temperature such that no liquefaction of said withdrawn portion takes place upon its expansion, expanding the thus warmed portion to a pressure of 4 to 12 pounds, introducing the expanded portion into the low pressure stage, purifying the crude liquid oxygen by filtering out carbon dioxide particles and absorbing dissolved acetylene therefrom, and introducing the thus purified crude liquid oxygen into the low pressure stage for further rectification.

3. A process for producing oxygen by the liquefaction and rectification of air in a rectification system comprising low and high pressure stages, which comprises passing a stream of air under pressure through a path in a reversing exchanger to recover the cold content of the outgoing nitrogen product of rectification and thus cool the air to a temperature close to its condensation point, periodically reversing the flow of air and the nitrogen rectification product through their respective paths in the reversing exchanger so that the nitrogen rectification product removes the carbon dioxide deposited in the reversing exchanger during the preceding step of the process, passing the thus cooled air through a body of crude liquid oxygen in the high pressure stage of the rectification system thus scrubbing said thus cooled air with said crude liquid oxygen, withdrawing a minor portion of the crude liquid oxygen-scrubbed air, warming the withdrawn minor portion by passing at least a part of said withdrawn minor portion through said exchanger in a counter-current direction to the flow of the air therethrough to raise the temperature of said withdrawn minor portion to a temperature such that no liquefaction of said withdrawn minor portion takes place upon its expansion, expanding the thus warmed portion, introducing the expanded portion into the low pressure stage of the rectification system, purifying the crude liquid oxygen by filtering out carbon dioxide particles and absorbing dissolved acetylene therefrom, and introducing the thus purified crude liquid oxygen as reflux into the low pressure stage of the rectification system.

4. A process for producing oxygen by the liquefaction and rectification of air in a rectification system comprising low and high pressure stages, which comprises passing a stream of air under pressure of 60 to 100 pounds and at a temperature of 70° to 110° F. through a path in a reversing exchanger to recover the cold content of the outgoing nitrogen product of rectification and thus cooling the air to a temperature close to its condensation point, periodically reversing the flow of air and the nitrogen rectification product through their respective paths in the reversing exchanger so that the nitrogen rectification product removes the carbon dioxide deposited in the reversing exchanger during the preceding step of the process, passing the thus cooled air through a body of crude liquid oxygen in the high pressure stage of the rectification system thus scrubbing said thus cooled air with said crude liquid oxygen, withdrawing from 15% to 35% of the crude liquid oxygen-scrubbed air, said crude liquid oxygen-scrubbed air containing at least 17% oxygen, warming the withdrawn portion by passing at least a part of said withdrawn portion through said exchanger in a countercurrent direction to the flow of the air therethrough to raise the temperature of said withdrawn portion to a temperature such that no liquefaction of said withdrawn portion takes place upon its expansion, expanding the thus warmed portion to a pressure of 4 to 12 pounds, introducing the expanded portion into the low pressure stage of the rectification system, purifying the crude liquid oxygen by filtering out carbon dioxide particles and absorbing dissolved acetylene therefrom, and introducing the thus purified crude liquid oxygen as reflux into the low pressure stage of the rectification system.

5. A process for producing oxygen by the liquefaction and rectification of air in a rectification system comprising low and high pressure stages, which comprises passing a stream of air in a path in a heat exchange zone, passing streams of oxygen and nitrogen rectification products through paths in said heat exchange zone in indirect heat exchange relation with the air, thus cooling the air to a temperature close to its condensation point, periodically reversing the flow of air and the nitrogen rectification product through their respective paths in the heat exchange zone so that the nitrogen rectification product upon each reversal removes the carbon dioxide deposited in said heat exchange zone during the preceding step of the process, passing the thus cooled air from said heat exchange zone through a body of crude liquid oxygen produced in the high pressure stage of the rectification system thus scrubbing said thus cooled air with said crude liquid oxygen, withdrawing a minor portion of the crude liquid oxygen-scrubbed air, warming the withdrawn minor portion by passing at least a part of said withdrawn minor portion through said heat exchange zone in a counter-current direction to the flow of the air therethrough to raise the temperature of said withdrawn minor portion to a temperature such that no liquefaction of said withdrawn minor portion takes place upon its expansion, expanding the thus warmed portion, introducing the expanded portion into the low pressure stage of the rectification system, purifying the crude liquid oxygen by filtering out carbon dioxide particles and absorbing dissolved acetylene therefrom, and introducing the thus purified crude liquid oxygen into the low pressure stage for further rectification.

6. A process for producing oxygen by the liquefaction and rectification of air in a rectification system comprising low and high pressure stages, which comprises passing a stream of air through a path in a heat exchange zone to cool the air to a temperature close to its condensation point, passing a stream of oxygen rectification product through a second path in the heat exchange zone in indirect heat exchange relation with the first-mentioned path, flowing from the rectification system a stream of nitrogen, dividing said stream into a major and a minor portion, passing the minor portion through a path extending through at least the cold end of said heat exchange zone in a direction countercurrent to the flow of air through its path in said heat exchange zone thereby warming said minor portion, mixing the thus warmed minor portion with said major portion, passing the resulting nitrogen mixture through still another path in said heat exchange zone in indirect heat exchange relation with the air, periodically reversing the flow of air and the mixed nitrogen stream through their respective paths in said zone so that upon each reversal the mixed nitrogen stream effects removal of carbon dioxide deposited in said zone during the preceding step of the process, passing the thus cooled air from said zone through a body of crude liquid oxygen formed in the high pressure stage of the rectification system thus scrubbing said thus cooled air with said crude liquid oxygen, withdrawing a minor portion of the crude liquid oxygen-scrubbed air, warming the withdrawn minor portion by indirect heat exchange with a stream that has passed through said heat exchange zone to a temperature such that no liquefaction of said withdrawn minor portion takes place upon its expansion, expanding the thus warmed portion, introducing the expanded portion into the low pressure stage of the rectification system, purifying the crude liquid oxygen by filtering out carbon dioxide particles and absorbing dissolved acetylene therefrom, and introducing the thus purified crude liquid oxygen into the low pressure stage for further rectification.

7. A process for producing oxygen by the liquefaction and rectification of air in a rectification system involving high and low pressure stages, which comprises passing air under pressure through regenerators through which had previously passed oxygen and nitrogen products of rectification to cool the air to a temperature close to its condenstion point, passing oxygen and nitrogen products of rectification through regenerators through which had previously passed the air, passing the thus cooled air through a body of crude liquid oxygen formed in the high pressure stage of the rectification system thus scrubbing said thus cooled air with said crude liquid oxygen, withdrawing a minor portion of the crude liquid oxygen-scrubbed air, warming the withdrawn minor portion by passing at least a part of said minor portion through an indirect heat exchange path in at least one of said regenerators to raise the temperature of said withdrawn minor portion to a temperature such that no liquefaction of said withdrawn minor portion takes place upon its expansion, expanding the thus warmed portion, introducing the expanded portion into the low pressure stage of the rectification system, purifying the crude liquid oxygen by filtering out carbon dioxide particles and absorbing dissolved acetylene therefrom, and introducing the thus purified crude liquid oxygen into the low pressure stage for further rectification.

8. A process for producing oxygen by the liquefaction and rectification of air in a rectification system involving high and low pressure stages, which comprises, step 1, passing air under pressure through regenerators through which had previously passed oxygen and nitrogen products of rectification to cool the air to a temperature near its condensation point and passing oxygen and nitrogen products of rectification through regenerators through which had previously passed the air, step 2, passing the thus cooled air through a body of crude liquid oxygen formed in the high pressure stage of the rectification system thus scrubbing said thus cooled air with said crude liquid oxygen, step 3, withdrawing a minor portion of the crude liquid oxygen-scrubbed air and warming the withdrawn minor portion by passing at least a part of said withdrawn minor portion through an indirect heat exchange path in at least one of said regenerators to raise the temperature of said withdrawn minor portion to a temperature such that no liquefaction of said withdrawn minor portion takes place upon its expansion, step 4, expanding the thus warmed portion and introducing the expanded portion into the low pressure stage of the rectification system, step 5, treating the crude liquid oxygen to remove carbon dioxide and acetylene therefrom and introducing the thus treated crude liquid oxygen as reflux into the low pressure stage of the rectification system, step 6, dividing the nitrogen rectification product withdrawn from the high pressure stage into a major and a minor portion, step 7, warming the minor nitrogen portion by passage through an indirect heat exchange path in at least one of said regenerators, and step 8, mixing the thus warmed minor nitrogen portion with said major ntirogen portion and employing the resulting mixture as the nitrogen rectification product passed through the regenerators in said step 1 of the process.

9. In the process for producing oxygen by the liquefaction and rectification of air wherein the air is compressed, cooled to a temperature close to its condensation point and rectified in a rectification system involving low and high pressure stages, and refrigeration is provided to the process by expanding a minor portion of the cooled compressed air to the pressure prevailing in the low pressure stage of the rectification system, the improvement of simultaneously avoiding the fouling of the expander by solid carbon dioxide during the expansion of said minor portion of the air and the hazard of explosion arising from the accumulation of acetylene in said low pressure stage, which comprises removing carbon dioxide and acetylene from said cooled compressed air by the steps of introducing all of said cooled compressed air at the bottom of the high pressure stage and therein scrubbing all of said cooled compressed air with oxygen-enriched liquid, withdrawing from said high pressure stage a minor portion of the thus scrubbed air as said minor portion to be expanded and passing said oxygen-enriched liquid which has been used in scrubbing said cooled compressed air through a bed of silica gel to absorb dissolved acetylene therefrom and filter out solid carbon dioxide particles.

10. A process for producing oxygen by the liquefaction and rectification of air in a rectification system involving high and low pressure stages, which comprises, step 1, passing air under pressure through a path in a heat exchange zone through which had previously passed a nitrogen rectification product to cool the air to a temperature near its condensation point and passing said nitrogen rectification product through a second path in said heat exchange zone through which had previously passed the air, the first mentioned path being in indirect heat exchange relation with said second path, step 2, passing the thus cooled air through a body of crude liquid oxygen formed in the high pressure stage of the rectification system thus scrubbing said thus cooled air with said crude liquid oxygen, step 3, withdrawing a minor portion of the crude liquid oxygen-scrubbed air and warming the withdrawn minor portion by passing at least a part of said withdrawn minor portion through a third path in said heat exchange zone to raise the temperature of said withdrawn minor portion to a temperature such that no liquefaction of said wtihdrawn minor portion takes place upon its expansion, step 4, expanding the thus warmed portion and introducing the expanded portion into the low pressure stage of the rectification system, step 5, removing carbon dioxide particles and dissolved acetylene from the crude liquid oxygen and introducing the thus purified crude liquid oxygen as reflux into the low pressure stage of the rectification system, step 6, warming the nitrogen rectification product withdrawn from the high pressure stage by passing at least part thereof in indirect heat exchange with the part of said withdrawn minor portion which was passed in step 3 through the third path in said heat exchange zone, and step 7, employing the thus warmed nitrogen as said nitrogen rectification product passed in step 1 through said heat exchange zone.

11. In apparatus for separating a gas mixture by low temperature rectification including a rectifying column, means for supplying the mixture at about its condensation pressure, and means for cooling such mixture by heat exchange with outflowing lower pressure gaseous material, the combination therewith of means for scrubbing such cooled mixture with a liquid fraction thereof to remove therefrom higher-boiling point impurities; means for eliminating impurities from said liquid fraction; means for passing the impurity-free liquid fraction to the rectifying column; means for liquefying a substantial portion of the cleaned mixture and passing same to the rectifying column and for separating the unliquefied remainder; means for warming said remainder of such cleaned mixture substantially sufficiently to avoid formation of liquid during subsequent expansion with external work; a work-producing expander connected to expand such warmed remainder; and heat exchange means connected to use refrigeration of the expanded remainder for liquefying some of the cleaned mixture to produce at least part of said liquid fraction and for addition of same to said scrubbing means.

12. A process for separating a gas mixture comprising lower- and higher-boiling-point components and containing impurities having higher condensing temperatures, which process comprises providing a stream of the mixture at a condensation pressure below about 100 p. s. i. freed of moisture, and cooled to a low temperature close to its condensation temperature at said pressure; scrubbing such stream with a liquid fraction to remove impurities therefrom and retain the impurities in the liquid fraction; subjecting such cleaned stream to partial liquefactions to produce at least part of said liquid fraction and a reflux liquid; diverting from the cleaned mixture stream an unliquefied portion thereof which at said condensation pressure; warming said unliquefied portion substantially sufficiently to avoid formation of liquid upon subsequent expansion; expanding with production of external work such rewarmed portion to a low pressure; eliminating impurities from said liquid fraction; rectifying, at a reduced pressure substantially equal to said low pressure, such impurity-free liquid fraction together with the undiverted portions of the mixture stream including said reflux liquid to separate lower- and higher-boiling products; and using part of the refrigeration of said work-expanded portion for effecting the partial liquefaction of scrubbed mixture to produce said liquid fraction, and the balance of the refrigeration for cooling gas mixture.

13. In apparatus for separating a gas mixture by low temperature rectification including a two-stage rectifying column, means for supplying said mixture under pressure, and means for cooling the pressurized mixture by heat exchange with outflowing lower pressure gaseous material, the combination therewith of means for bringing said cooled mixture into scrubbing contact with a liquid fraction thereof in the higher-pressure stage of said rectifying column to remove higher-boiling-point impurities from said mixture; means for eliminating impurities from said liquid fraction; means for passing the impurity-free liquid fraction to the lower-pressure stage of said rectifying column; means for passing a portion of the scrubbed mixture from the lower part of said higher-pressure stage to a warming passageway disposed in heat exchange relation with said means for cooling the pressurized mixture; means for passing the resulting warmed portion of said mixture from said warming passageway to a work-producing expander; and means to convey the resulting expanded portion of said mixture into said lower-pressure stage at an intermediate level thereof.

14. The apparatus of claim 13 wherein the means for cooling the pressurized mixture is a reversing heat exchanger of the recuperative type and the warming passageway is disposed in heat exchange relation with only the colder portion of said reversing exchanger.

References Cited in the file of this patent

UNITED STATES PATENTS

| | | |
|---|---|---|
| 2,256,421 | Borchardt | Sept. 16, 1941 |
| 2,408,710 | Nuys | Oct. 1, 1946 |
| 2,433,604 | Dennis | Dec. 30, 1947 |
| 2,460,859 | Trumpler | Feb. 8, 1949 |
| 2,572,933 | Houvener | Oct. 30, 1951 |
| 2,668,425 | Skaperdas | Feb. 9, 1954 |

OTHER REFERENCES

Chemical Engineering, March 1947, pp. 126–134.